Feb. 26, 1963    L. BRADT ET AL    3,078,810
DRAGLINE SYSTEM
Filed Sept. 8, 1961
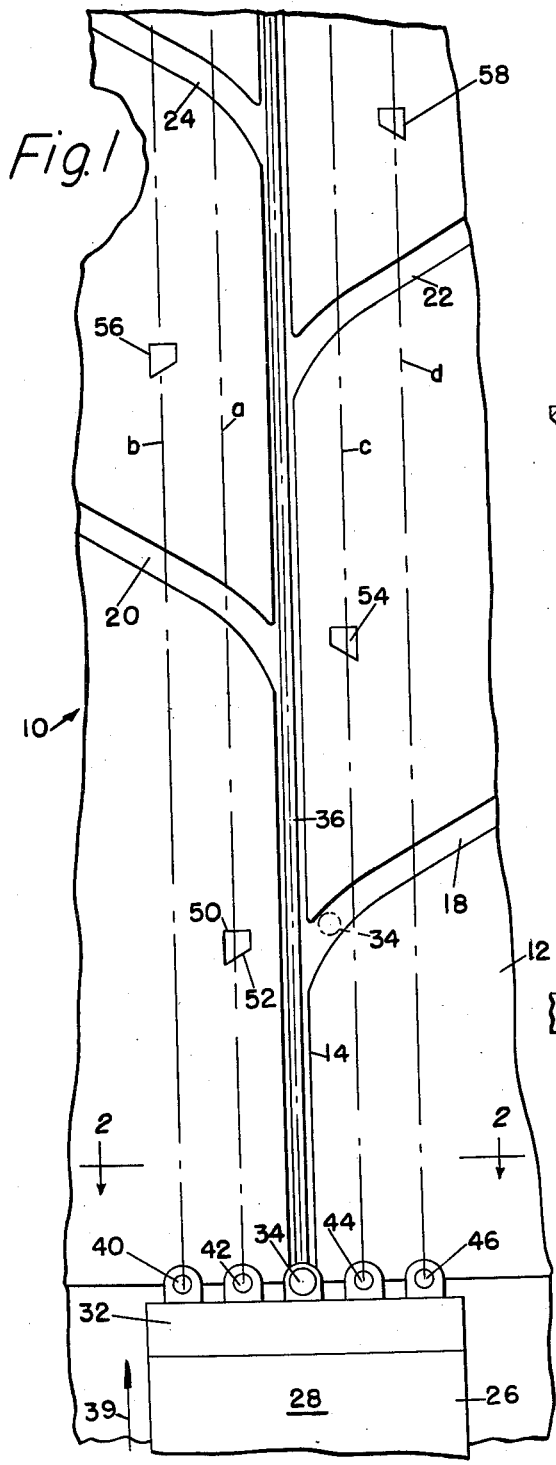
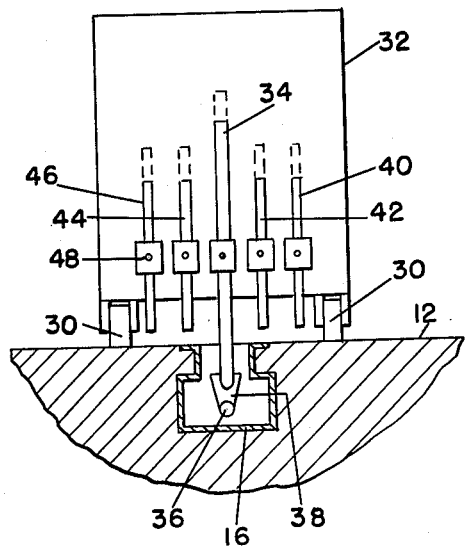
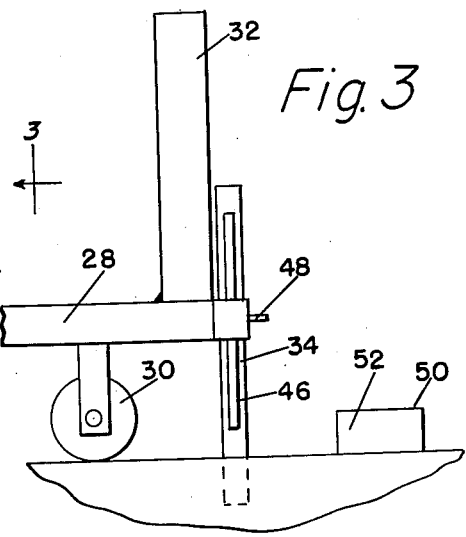
INVENTORS
LYNN BRADT
JOHN G. DORRANCE
BY
Arthur H. Seidel
ATTORNEY

United States Patent Office 3,078,810
Patented Feb. 26, 1963

3,078,810
DRAGLINE SYSTEM
Lynn Bradt, Easton, Pa., and John G. Dorrance, Phillipsburg, N.J., assignors to S.I. Handling Systems, Inc., Phillipsburg, N.J., a corporation of Pennsylvania
Filed Sept. 8, 1961, Ser. No. 136,917
7 Claims. (Cl. 104—88)

This invention relates to a dragline system, and more particularly, to a dragline system wherein a cart or truck is towed by means of a tow pin extending through a main slot so that the cart or truck may be automatically directed or switched to a shunt slot.

In dragline systems, it is often desirable to automatically switch a designated truck being propelled by a tow line disposed beneath the floor of a building by means of a tow pin extending through a main slot into a pre-selected area having a shunt slot communicating with the main slot. The dragline system is particularly adaptable to use in warehouses, freight terminals, or the like and the area into which the shunt slot extends may be a loading, unloading, or storage area. The function of the area is not important, but its location relative to the main slot is important.

Dragline systems have been proposed heretofore. In such systems, the tow line is in alignment with the main slot and cooperates with a tow pin on the cart or truck to propel the same. The main slot guides the tow pin during movement of the cart or truck. The tow line may be beneath the floor or above the cart or truck. The main slot is generally intersected at intervals by shunt slots which are in communication therewith and extend laterally therefrom.

If the main slot is disposed in the floor of the building or the like, metal flanged elements defining the main slot and shunt slots are generally flush with said floor. If the tow line is disposed overhead, the slots may be in the floor as described above or disposed overhead. Each of the carts or trucks are provided with a generally vertically disposed adjustable tow pin in the front of the cart or truck. Such tow pin extends into and is guided by the main slot and also engages the tow line or conveyor. The trucks or carts are preferably provided with wheels which engage the floor of the building or the like. The towed relation causes the tow pin to move in the main slot.

The present invention is directed to a means which is adapted to cooperate with the carts and trucks so that the tow pin will be caused to move into a pre-selected shunt slot. In the preferred embodiment of the present invention, the switching means comprises an abutment on the floor of the building or the like slightly in advance of the point at which the pre-selected shunt slot intersects the main slot. The abutment is provided with a wedging surface or face which intersects the center line of the main slot at an acute angle therewith. If an overhead conveyor system is provided, the abutment may be supported from above the carts or trucks for abutting contact therewith so as to provide the selected switching of the cart or truck from the main slot to a shunt slot.

It is an object of the present invention to provide a simple inexpensive switching arrangement for dragline systems.

It is another object of the present invention to provide a tow line truck or cart with coordinated switching means whereby a truck or cart may be automatically switched into a predetermined shunt slot.

It is another object of the present invention to provide a novel dragline system wherein abutment means are provided to switch a truck from a main slot to a shunt slot extending laterally from said main slot.

It is still another object of the present invention to provide a dragline system with means for automatically switching carts or trucks from a main slot to a shunt slot, said means being in the nature of an abutment on the surface of the floor in which said main slot and shunt slot are disposed.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial top plan view of a floor of a building incorporating the novel dragline system of the present invention, with a truck being towed along the main slot.

FIGURE 2 is a transverse sectional view taken along the lines 2—2 in FIGURE 1.

FIGURE 3 is an elevation view taken along the lines 3—3 in FIGURE 1.

Referring to the drawing in detail, wherein like numerals indicate like elements, there is shown in FIGURE 1 a portion of a dragline system of the present invention designated generally as 10.

The dragline system 10 includes a floor 12 of a building or the like having a main slot 14 therein. The main slot 14 is defined by a channel-shaped member 16 disposed within and flush with the upper surface of the floor 12. Alternatively, member 16 may be supported on the upper surface of floor 12. A plurality of shunt slots 18, 20, 22 and 24 extend from the main slot 14 at spaced points therealong. As illustrated, the shunt slots 18—24 are disposed in an alternating pattern with shunt slot 18 extending to one side of the main slot 14, slot 20 extending to the other side of the main slot 14, etc. If desired, all of the shunt slots may be disposed so as to extend laterally to one side of the main slot 14.

It will be noted that each of the shunt slots 18—24 extends from the main slot 14 at an acute angle with the center line of the main slot 14. While only four shunt slots are illustrated in the drawing, it will be obvious that a greater or lesser number of shunt slots are utilized. It is to be understood that the shunt slots 18—24 are also provided with a channel-shaped member comparable to member 16.

A truck 26 is provided to carry the material from one position to another position within the building of which the floor 12 is a part. The truck 26 is provided with a substantially horizontal base which is generally rectangular in plane view. A wheel 30 depends from each corner of the base 28 and supports the base 28 for rolling movement along the floor 12. At its forward end, the base 28 is provided with an upright wall or standard 32.

A vertically disposed tow pin is adjustably supported in front of the standard 32. The tow pin 34 cooperates with a dog 38 on the tow line 36 to cause the truck 26 to move in the direction of arrow 39 in FIGURE 1. The tow line 36 is a cable or the like which is mechanically driven by a motor or the like (not shown). The tow line 36 is provided with a plurality of dogs comparable to dog 38 at spaced points therealong. When a dog 38 contacts the tow pin 34 in a lowermost position of the tow pin, the truck 26 is caused to move in the direction of the tow line 36.

A plurality of trip rods 40—46 are supported in a vertical disposition by a suitable bracket or the like in front of the standard 32. The trip rods 40—46 may be of slightly smaller diameter than the tow pin 34 and are disposed in alignment, laterally of the truck, with the tow pin 34. The tow pin 34 and the trip rods 40—46 are illustrated in their lowermost position. Any convenient means such as pin 48 may be provided so that the tow pin 34 and the rods 40—46 may have an upper position as shown in phantom in FIGURE 2. The pin 48 is designed to cooperate with a hole in or notch on the tow pin 34 and trip rods 40—46. It will be obvious to those skilled in the art that other equivalent mechanisms may be provided so as to have manual adjustment of the vertical disposition of the tow pin 34 and the rods 40—46.

An abutment 50 is provided adjacent to and slightly to the left of the point at which the shunt slot 18 intersects the main slot 14. The abutment 50 is fixedly secured to the floor 12 and extends above the surface of the floor 12 as illustrated more clearly in FIGURE 3. The abutment 50 is provided with a cam face 52 which is disposed at an acute angle with respect to the center line of the main slot 14 and extends toward the shunt slot 18. An abutment 54 is fixedly secured to the floor 12 in a disposition so that a cam face thereon is disposed at an acute angle with respect to the center line of the main slot 14 and extends toward the shunt slot 20.

An abutment 56 is fixedly secured to the floor 12 and is provided with a cam face extending at an acute angle with respect to the center line of the main slot 14. The cam face on the abutment 56 extends toward the shunt slot 22. An abutment 58 is fixedly secured to the floor 12. The abutment 58 is provided with a cam face disposed at an acute angle with respect to the center line of the main slot 14 and extends toward the shunt slot 24.

Each of the abutments 50, 54, 56 and 58 are identical. The abutments 50 and 54 are spaced an equal distance from the center line of the main slot 14. The abutments 56 and 58 are spaced an equal distance from the center line 14. As the truck 26 moves in the direction of arrow 39, the pin 42 tends to move along the line *a* which intersects the cam surface 52. In like manner, the pin 40 moves along line *b* which intersects the cam surface on the abutment 56, the pin 44 moves along line *c* which intersects the cam surface on abutment 54, and pin 46 tends to move along line *d* which intersects the cam surface on the abutment 58.

The operation of the system 10 is as follows:

The truck 26, for example, may be loaded with material at a loading point and positioned over the main slot 14 so that the next dog on the tow line 36 engages the tow pin 34. For purposes of illustration, it will be assumed that trip rods 40, 44 and 46 have been adjusted to their phantom position illustrated in FIGURE 2. The tow pin 34 and the trip rod 42 will be in the solid line position illustrated in FIGURE 2.

As the next dog on the tow line 36 engages the tow line 34, the truck 26 is conveyed by the tow line along the main slot 14. As the truck 26 approaches the shunt slot 18 which has been preselected by disposing the trip rod 42 in its lowermost position, the lower end of the trip rod 42 engages the cam face 52 thereby imparting a force to the truck 26. Such force causes the tow pin 34 to move sideways out of engagement with the dog on the tow line 36 into the shunt slot 18. The shunt slot 18 guides the tow pin 34 and causes the truck 26 to move in a lateral direction with respect to the main slot 14. No positive means is illustrated in the drawing for moving the truck 26 along the shunt slot 18. Such movement along the shunt slot 18 is occasioned by the moment of inertia of the truck 26 and is sufficient to enable the truck 26 to move for the entire length of the relatively short shunt slot. However, a positive means may be provided if desired.

For purposes of illustration, the operation of the present invention is being explained with a tow pin which is moved laterally out of engagement with the dog on the tow line 36 when the selected trip rod engages the cam face of a fixed abutment. It is within the scope of the present invention to cause the tow pin 34 to move vertically out of engagement with the dog on the tow line 36 when the selected trip rod engages the cam face on the abutment when the truck is switched to a shunt slot.

If it is desired to cause the truck 26 to be automatically switched into the area having the shunt slot 24, the trip rods 40, 42 and 44 will be in their phantom position illustrated in FIGURE 2. The trip rod 46 will be in the solid line position illustrated in FIGURE 2. As the truck 26 is caused to move along the main slot 14 as described above, the uppermost position of the trip rods 40, 42 and 44 will enable such trip rods to clear the abutment in their respective paths. When the trip rod 46 engages the cam face on the abutment 58, the truck 26 will be diverted into the shunt slot 24 as described above.

While the abutments have been described above as being fixedly secured to the floor 12 of the building or the like, it will be appreciated by those skilled in the art that the abutments may be fixedly secured in depending relation from an overhead frame or ceiling or the like. In like manner, the tow line 36 may be disposed in an overhead disposition for engagement with a tow pin on the truck 26. It will be appreciated that the wheels 30 on the truck 26 have a sufficient width so as not to be trapped within the main slot 14 or any of the shunt slots when passing thereacross.

Thus, it will be seen that the objects of the present invention wherein a simple inexpensive switching means in a dragline system have been provided so that trucks may be automatically switched to a shunt slot from a main slot in a pre-selected manner. In addition to being simple and inexpensive, the switching means of the present invention is reliable and completely automatic. Since the abutments are fixed to the floor, and contain no movable elements, it will be appreciated that the switching means of the present invention is less likely to be out of order thereby avoiding jam-ups of trucks along the main slot 14.

The present invention may be embodied in other specific forms without departing from the spirit or essential attributes thereof and, accordingly, reference should be made to the appended claims, rather than to the foregoing specification as indicating the scope of the invention.

We claim:

1. In a dragline system comprising a first means defining a main slot, a second means defining a shunt slot intersecting said main slot at an acute angle with respect to the center line of said main slot, an abutment fixedly secured with respect to said first means, said abutment having a cam surface thereon, a truck having a tow pin, a portion of said pin being in said main slot, and a trip rod on said truck traversing a path intersecting said abutment so as to have engagement with said cam surface and develop a force in a direction and of a magnitude to cause the tow pin to move from said main slot into said shunt slot.

2. In a dragline system comprising a main slot in a floor, first and second shunt slots in said floor extending laterally from said main slot, said first and second shunt slots intersecting said main slot at acute angles to the center line of said main slot at spaced points therealong, a first abutment fixedly secured to said floor laterally of said main slot and adjacent the point at which said first slot intersects said main slot, a cam face on said first abutment, said cam face extending along a line forming an acute angle with respect to the center line of said main slot, a second abutment fixed to said floor laterally of said main slot and adjacent the point at which said second slot intersects said main slot, said second abutment having a cam face extending along a line forming an acute angle with the center line of said main slot, each of said abutments being selectively operative to direct a tow pin from said main slot into its respective shunt slot.

3. In a dragline system in accordance with claim 2 including a truck, a tow pin on said truck having a portion disposed in said main slot, at least two trip rods mounted on said truck, means for selectively adjusting the vertical disposition of said trip rods, each trip rod having a lowermost position wherein it is capable of abuttingly contacting the cam face on a separate one of said abutments and an upper position wherein it may pass over said abutments without engaging the same.

4. In a dragline system comprising a floor, said floor having a main slot, a shunt slot extending laterally from said main slot and intersecting said main slot at an acute angle with respect to the center line of said main slot, said shunt slot extending to one side of said main slot, an abutment on said floor laterally spaced from and on the other side of said main slot, and said abutment having a cam face lying along a line which is parallel to the center line of said main slot, said abutment being selectively operative to direct a tow pin from said main slot into said shunt slot.

5. In a system in accordance with claim 4 including a truck, a tow pin on said truck disposed within said main slot, and an abutment engaging element on said truck disposed so as to impinge against said cam face and develop a force transverse of said truck to urge said tow pin into said shunt slot.

6. In a dragline system in accordance with claim 2 wherein the cam face on said second abutment is spaced from the center line of said main slot by a distance greater than the distance between the cam face on said first abutment and the center line of said main slot.

7. In a dragline system in accordance with claim 2 wherein said first and second abutments are on opposite sides of said main slot, and the distance from the center line of said main slot to the cam faces on said abutments being substantially equal.

References Cited in the file of this patent

UNITED STATES PATENTS

| | | |
|---|---|---|
| 1,124,268 | Bernheim | Jan. 12, 1915 |
| 2,936,718 | Bradt et al. | May 17, 1960 |